United States Patent
Erbas-Sen et al.

(10) Patent No.: US 9,322,560 B2
(45) Date of Patent: Apr. 26, 2016

(54) COMBUSTOR BULKHEAD ASSEMBLY

(71) Applicant: UNITED TECHNOLOGIES CORPORATION, Farmington, CT (US)

(72) Inventors: Nurhak Erbas-Sen, Manchester, CT (US); Frank J. Cunha, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 686 days.

(21) Appl. No.: 13/630,888

(22) Filed: Sep. 28, 2012

(65) Prior Publication Data

US 2014/0090402 A1   Apr. 3, 2014

(51) Int. Cl.
| | |
|---|---|
| F23R 3/00 | (2006.01) |
| F23R 3/50 | (2006.01) |
| F23R 3/16 | (2006.01) |
| F23R 3/28 | (2006.01) |
| F23R 3/04 | (2006.01) |
| F23R 3/10 | (2006.01) |

(52) U.S. Cl.
CPC . *F23R 3/50* (2013.01); *F23R 3/002* (2013.01); *F23R 3/04* (2013.01); *F23R 3/10* (2013.01); *F23R 3/16* (2013.01); *F23R 3/283* (2013.01); *F23R 2900/03041* (2013.01); *F23R 2900/03043* (2013.01); *F23R 2900/03044* (2013.01); *F23R 2900/03045* (2013.01); *Y02T 50/675* (2013.01)

(58) Field of Classification Search
CPC .................................. F23R 2900/03041; F23R 2900/03043–2900/03045; F23R 3/002; F23R 3/04; F23R 3/10; F23R 3/16; F23R 3/283; F23R 3/50
See application file for complete search history.

(56) References Cited

U.S. PATENT DOCUMENTS

| | | | |
|---|---|---|---|
| 4,934,145 A | 6/1990 | Zeisser | |
| 5,271,219 A * | 12/1993 | Richardson | F23R 3/10 60/39.11 |
| 5,396,759 A | 3/1995 | Richardson | |
| 5,918,467 A | 7/1999 | Kwan | |
| 6,164,074 A | 12/2000 | Madden et al. | |
| 6,751,961 B2 | 6/2004 | Pacheco-Tougas et al. | |
| 6,978,618 B2 | 12/2005 | Pacheco-Tougas et al. | |
| 7,730,725 B2 | 6/2010 | Faulder et al. | |
| 7,748,221 B2 | 7/2010 | Patel et al. | |
| 7,770,397 B2 | 8/2010 | Patel et al. | |
| 2002/0178734 A1 * | 12/2002 | Stastny | 60/796 |
| 2008/0089787 A1 * | 4/2008 | Abdel-Messeh et al. | 416/179 |
| 2008/0115506 A1 * | 5/2008 | Patel et al. | 60/804 |
| 2009/0000303 A1 * | 1/2009 | Patel et al. | 60/752 |
| 2011/0197590 A1 * | 8/2011 | Bottcher | F23R 3/002 60/752 |

OTHER PUBLICATIONS

International Search Report for International Application No. PCT/US13/51319; Date of Mailing: Dec. 6, 2013.
Written Opinion for International Application No. PCT/US13/51319; Date of Mailing: Dec. 6, 2013.

* cited by examiner

*Primary Examiner* — Gerald L Sung
*Assistant Examiner* — Scott Walthour
(74) *Attorney, Agent, or Firm* — Cantor Colburn LLP

(57) ABSTRACT

A heat shield is disclosed. The heat shield may comprise a body having a back surface and an opposite front surface, wherein an opening in the body communicates through the front and back surfaces. The heat shield may further comprise at least one radial rail disposed on the back surface and extending radially outward from the opening for directing cooling air flow.

18 Claims, 10 Drawing Sheets

COMBUSTOR BULKHEAD ASSEMBLY

FIELD OF THE DISCLOSURE

The present disclosure relates generally to gas turbine engines and, more particularly, to combustors of a gas turbine engine.

BACKGROUND OF THE DISCLOSURE

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed by the combustor to the turbine where power is extracted from the hot gases by causing blades of the turbine to rotate.

The combustor is typically comprised of spaced apart inner and outer liners, which define a combustion chamber. At the upstream end of the combustion chamber is a bulkhead. The bulkhead includes a plurality of openings to accommodate fuel nozzles, which project into the forward end of the combustion chamber to supply fuel.

Due to the introduction and ignition of the combustion process, the bulkhead is subject to extremely high temperatures. As a result, damage to the bulkhead may occur from exposure to hot combustion gases. Accordingly, there exists a need to provide the bulkhead with effective cooling.

SUMMARY OF THE DISCLOSURE

According to one embodiment of the present disclosure, a heat shield for a combustor is disclosed. The heat shield may comprise a body having a back surface and an opposite front surface, wherein an opening in the body communicates through the front and back surfaces. The heat shield may further comprise at least one radial rail disposed on the back surface and extending radially outward from the opening for directing cooling air flow.

In a refinement, a plurality of effusion holes may extend from the back surface to the front surface, the effusion holes providing discharge of the cooling air flow from the back surface to the front surface.

In a related refinement, the plurality of effusion holes may extend either perpendicularly or at an angle from the back surface to the front surface.

In another refinement, at least one oblong-shaped rib may be disposed on the back surface.

In another refinement, a plurality of radial inner ribs may be disposed on the back surface near an inner edge of the body.

In another refinement, a plurality of radial outer ribs may be disposed on the back surface near an outer edge of the body.

In another refinement, on the back surface of the body, an inner rail may disposed about an inner edge of the body, an outer rail may be disposed about an outer edge of the body, a first side rail may be disposed about a first side edge of the body, a second side rail may be disposed about a second side edge of the body, a circular rail may be concentrically disposed about the opening, and a mid-rail laterally may extend from opposite sides of the circular rail to the first and second side rails, the mid-rail dividing the body into a radially outward half and a radially inward half with respect to the combustor centerline.

In a related refinement, a first set of effusion holes may be disposed between the inner rail and a plurality of radial inner ribs, the inner rail and the plurality of radial inner ribs directing the cooling air flow to the first set of effusion holes. A second set of effusion holes may be disposed between the outer rail and a plurality of radial outer ribs, the outer rail and the plurality of radial outer ribs directing the cooling air flow to the second set of effusion holes.

In a related refinement, a third set of effusion holes may surround the circular rail, and the inner, outer, first side, second side, circular, mid- and radial rails and radial inner and outer ribs may direct the flow to the third set of effusion holes.

In a related refinement, the radial inner and outer ribs may generally extend circumferentially with respect to the combustor centerline and may be laterally oriented in a staggered arrangement near the inner and outer edges, respectively.

In a related refinement, a staggered arrangement of the radial inner and outer ribs may at least partially separate the inner and outer edges from the rest of the body.

In another refinement, a plurality of pins may be disposed on the back surface, and the pins spatially may be arranged in a diamond formation.

In another refinement, a plurality of pins may be disposed on the back surface, and the pins may be spatially arranged in a chevron formation.

In yet another refinement, a plurality of raised trip strips may be disposed on the back surface, and the plurality of raised trip strips may be configured to further direct flow on the back surface.

In a related refinement, the raised trip strips may be v-shaped or chevrons.

According to another embodiment, a bulkhead assembly is disclosed. The bulkhead assembly may comprise a heat shield mounted to and spaced apart from a shell, the shell having a plurality of impingement holes through which flow passes and impinges on the heat shield. The heat shield may have a body having a back surface and an opposite front surface, wherein an opening in the body communicates through the front and back surfaces. The heat shield may further have a plurality of radial rails disposed on the back surface and extending radially outward from the opening, the radial rails dividing the back surface of the body into a plurality of compartments for directing cooling air flow. The heat shield may further have a plurality of effusion holes in the body communicating through the front and back surfaces, the effusion holes providing discharge of the flow from the back surface to the front surface.

In a refinement, each of the impingement holes through the shell may be located to achieve isothermal temperatures on the heat shield.

In another refinement, hot gas path temperatures and the compartments on the back surface of the heat shield may determine a number and location of impingement holes on the shell.

According to yet another embodiment, a combustor for a gas turbine engine is disclosed. The combustor may comprise an inner liner and an outer liner defining a combustion chamber, and a bulkhead assembly at one end of the combustion chamber. The bulkhead assembly may have a heat shield mounted to and spaced apart from a shell. The heat shield may have a body having a back surface and an opposite front surface, the back surface facing the shell, and wherein an opening in the body communicates through the front and back surfaces. The heat shield may further have a plurality of radial rails disposed on the back surface and extending radially outward from the opening, the radial rails dividing the back surface of the body into a plurality of compartments for directing cooling air flow. The shell may have a plurality of impingement holes through which flow passes and impinges on the back surface of the body of the heat shield, each of the impingement holes located to achieve isothermal temperatures on the panels.

In a refinement, the radial rails and the compartments may provide preferential orientation of the cooling air flow toward a plurality of effusion holes through the body of the heat shield.

These and other aspects and features of the disclosure will become more readily apparent upon reading the following detailed description when taken in conjunction with the accompanying drawings.

While the present disclosure is susceptible to various modifications and alternative constructions (i.e. may be a manufacturing or repair technic), certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
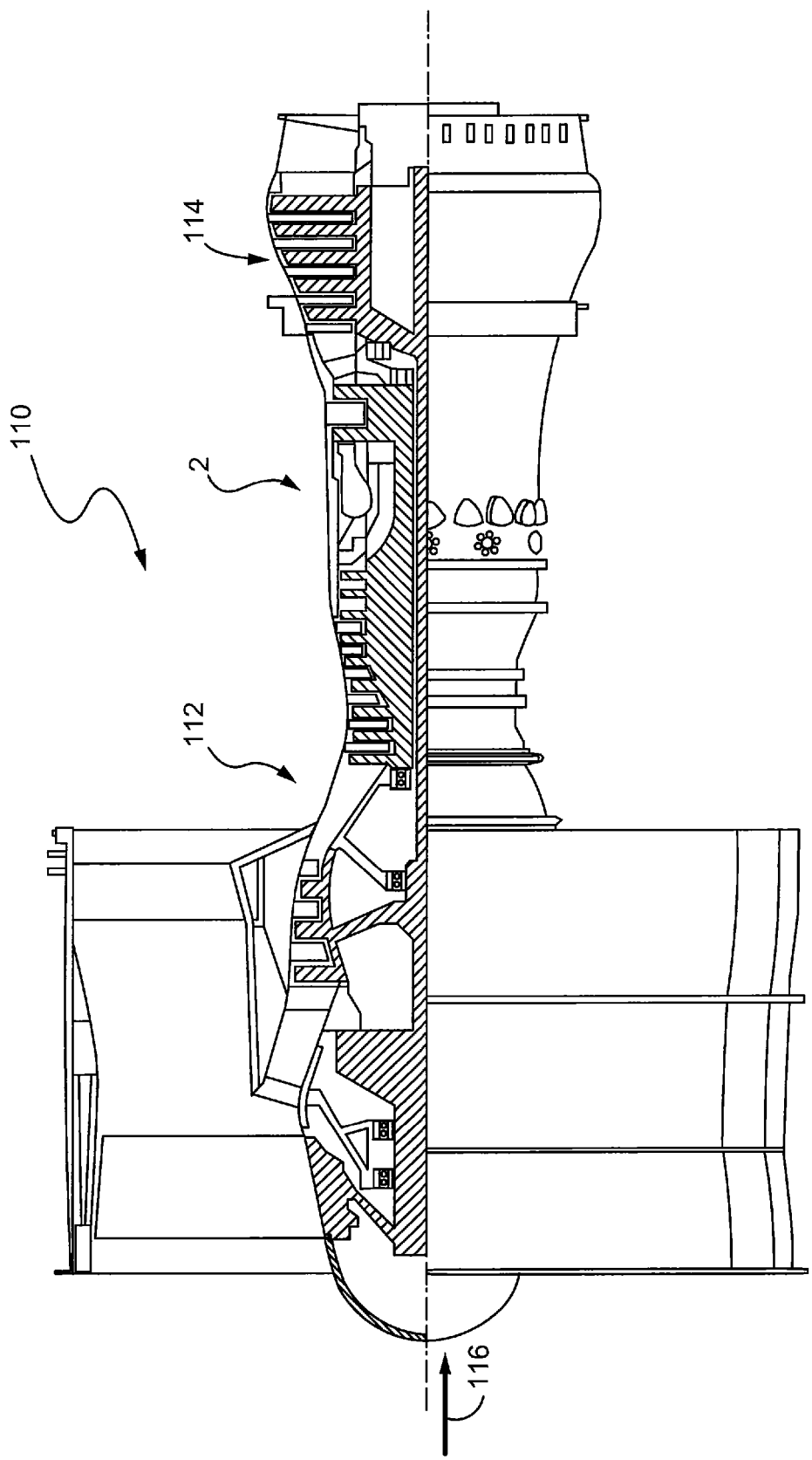
FIG. 1 is a schematic cross-sectional view of a gas turbine engine according to one embodiment of the present disclosure.

Referring now to the drawings, and with specific reference to FIG. 1, in accordance with the teachings of the disclosure, an exemplary gas turbine engine 110 is shown. The gas turbine engine 110 may generally comprise a compressor section 112 where air is pressurized, a combustor 2 which mixes and ignites the compressed air with fuel generating hot combustion gases, a turbine section 114 for extracting power from the hot combustion gases, and an annular flow path 116 extending axially through each. It will be understood that the combustor 2 as disclosed herein is not limited to the depicted embodiment of the gas turbine engine 110 but may be applicable to other types of gas turbine engines.

Figure 2:
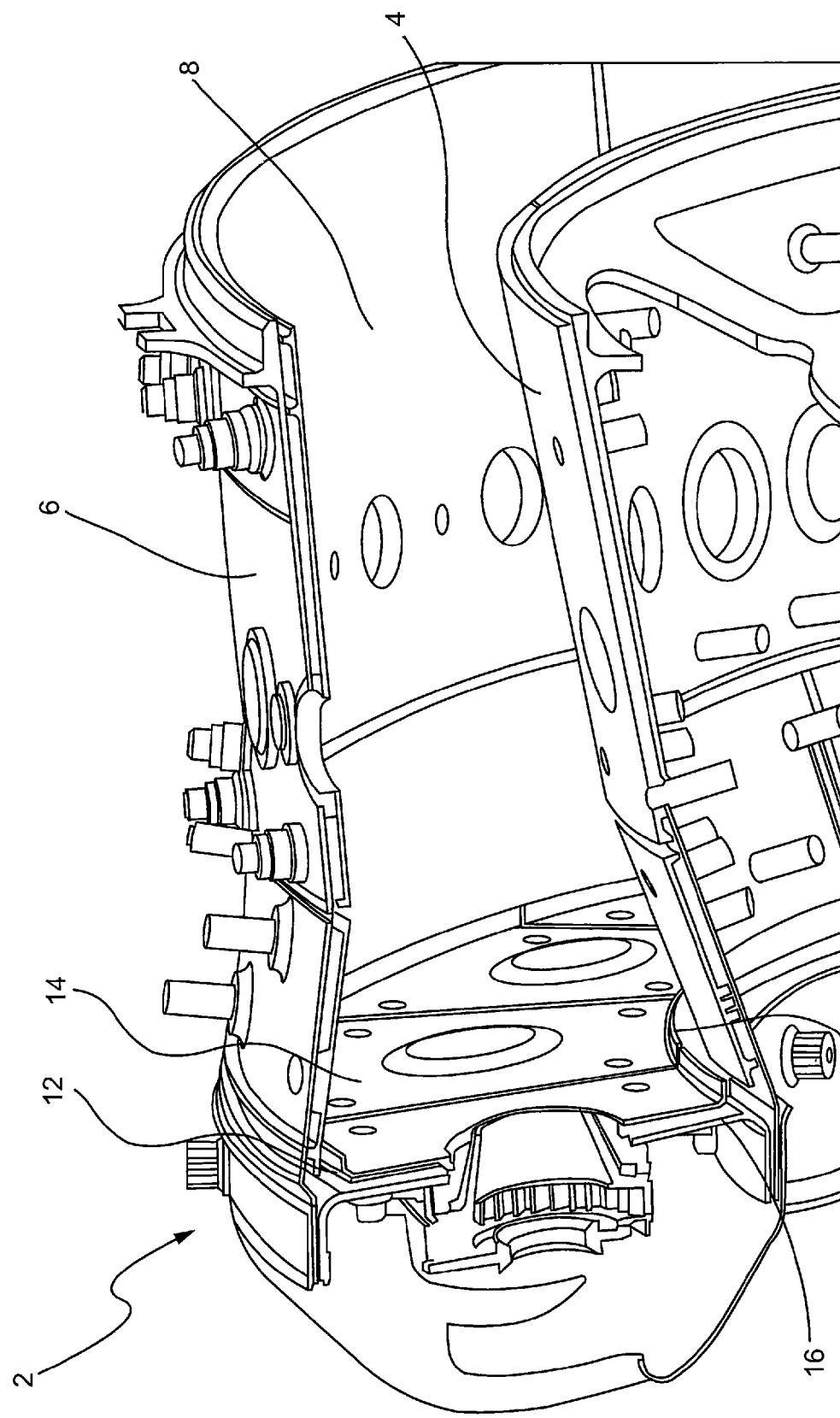
FIG. 2 is a cross-sectional view of part of a combustor of the gas turbine engine of FIG. 1.
Figure 3:
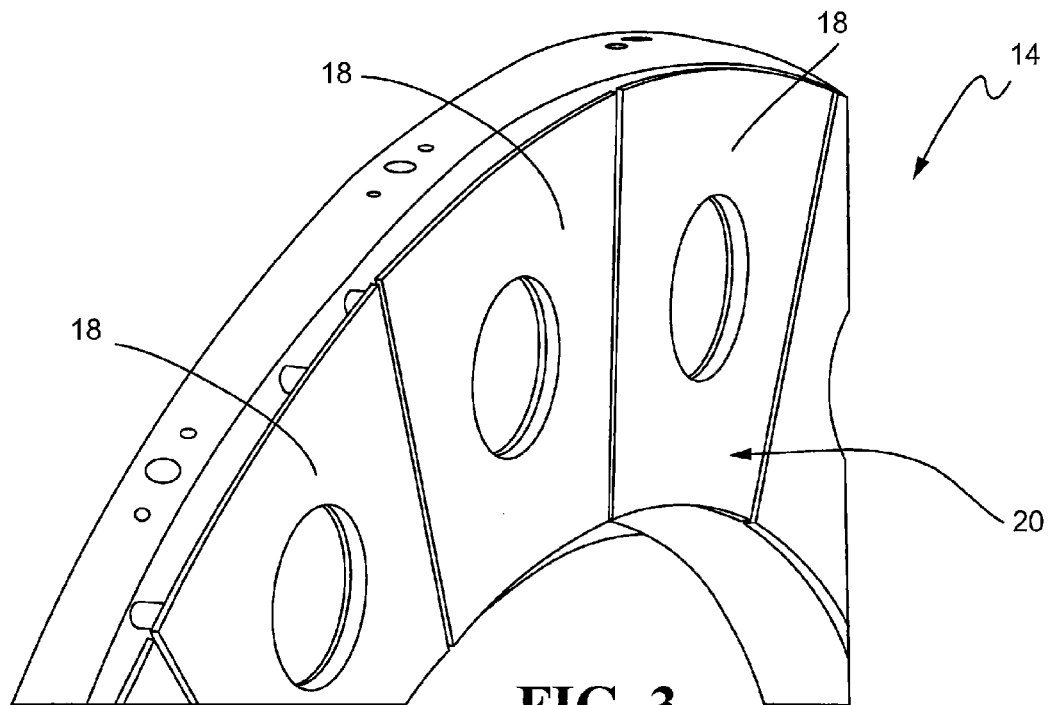
FIG. 3 is a perspective view of a front surface of a heat shield of the combustor of FIG. 2.
Figure 4:
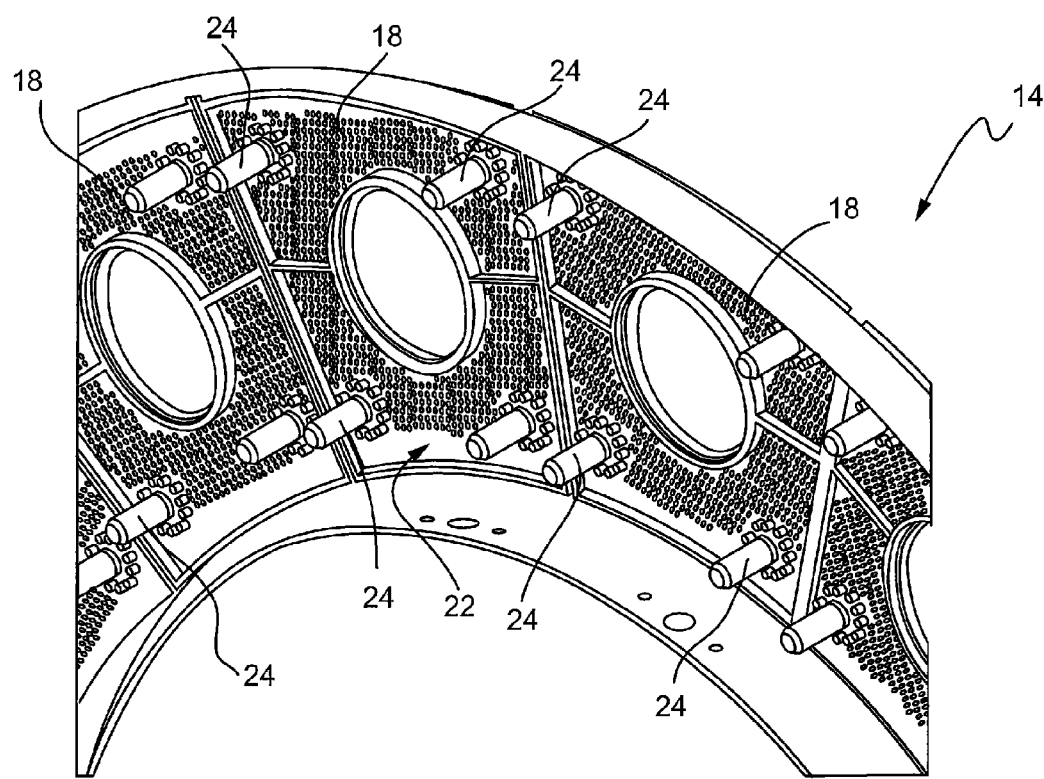
FIG. 4 is a perspective view of a back surface of the heat shield of FIG. 3.

Referring now to FIG. 2, an exemplary cross-sectional view of part of a combustor 2 of the gas turbine engine 110 is shown. The combustor 2 may comprise an inner liner 4 and an outer liner 6, which define a combustion chamber 8. At an upstream end 10 of the combustion chamber 8 may be a bulkhead assembly 12. The bulkhead assembly may comprise a bulkhead heat shield 14 mounted to a bulkhead shell 16. The heat shield 14 may be spaced apart from the shell 16 such that there is a distance between the heat shield 14 and shell 16. As shown best in FIGS. 3 and 4, the heat shield 14 may be comprised of a plurality of panels 18 having a front surface 20 and a back surface 22 facing the shell 16. On the back surface 22 of the panel 18 may extend a plurality of studs 24 for mounting of the panel 18 onto the shell 16 and for maintaining the distance between the heat shield 14 and the shell 16. To provide cooling for the heat shield 14, the shell 16 may have a plurality of impingement holes through which air flow passes and impinges on the back surface 22 of the heat shield 14. The impingement holes on the shell 16 may be normal or angled to the heat shield 14.

Figure 5:
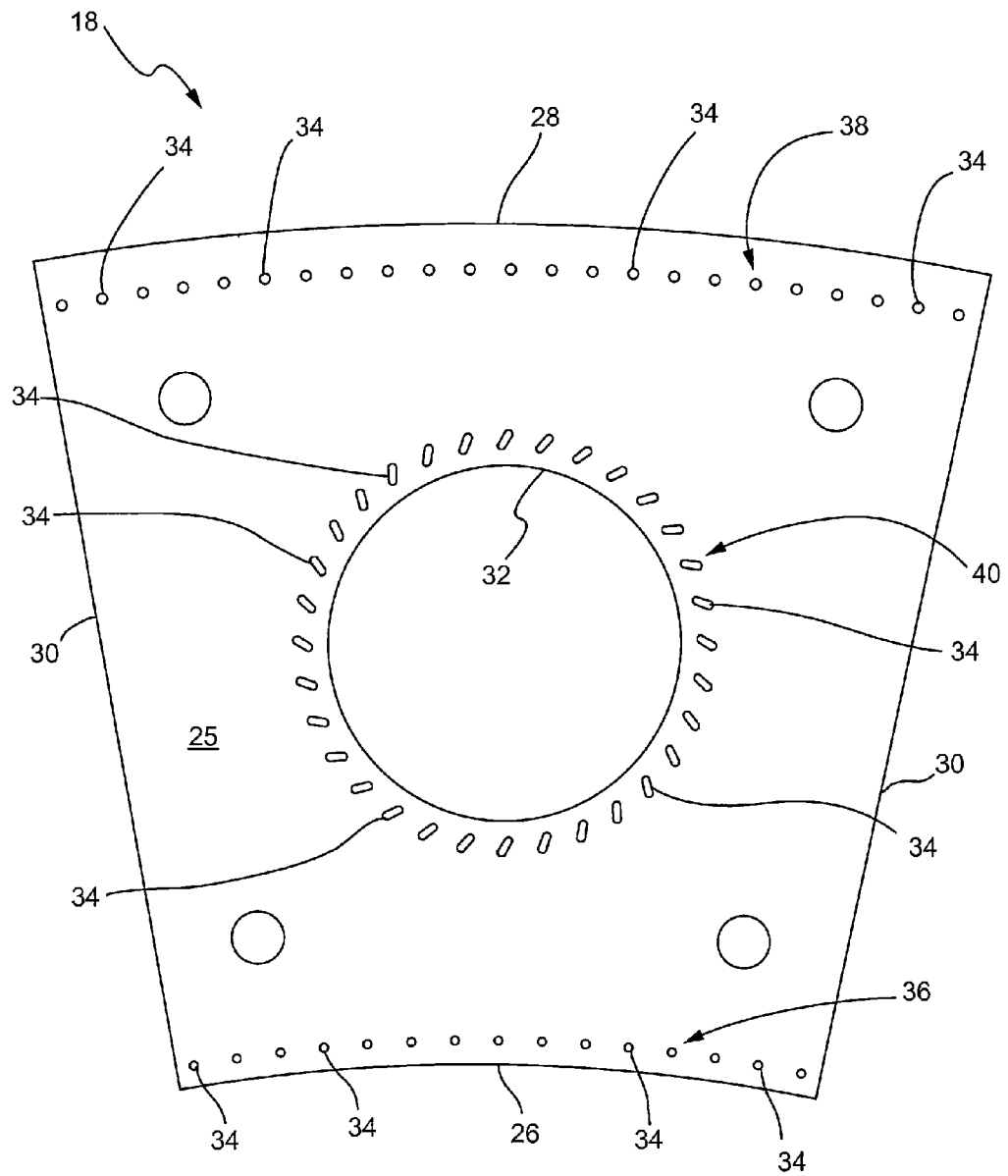
FIG. 5 is a front view of a panel of the heat shield of FIG. 4.

Referring now to FIG. 5, each panel 18 of the heat shield 14 may comprise a body 25 having a radially inner edge 26, a radially outer edge 28, and two lateral edges 30 which abut circumferentially adjacent heat shield panels. Each panel 18 may also have a fuel nozzle opening 32 to accommodate a fuel nozzle and a plurality of effusion holes 34 to provide discharge of the impingement flow from the back surface 22 to the front surface 20 of the panel 18 and into the combustion chamber 8. For example, the plurality of effusion holes 34 may include a first set 36 of effusion holes 34 surrounding the radially inner edge 26, a second set 38 of effusion holes 34 surrounding the radially outer edge 28, and a third set 40 of effusion holes 34 surrounding the fuel nozzle opening 32. The effusion holes 34 may extend perpendicularly from the back surface 22 to the front surface 20 of the panel 18, or they may extend at an angle from the back surface 22 to the front surface 20 of the panel 18.

Figure 6:
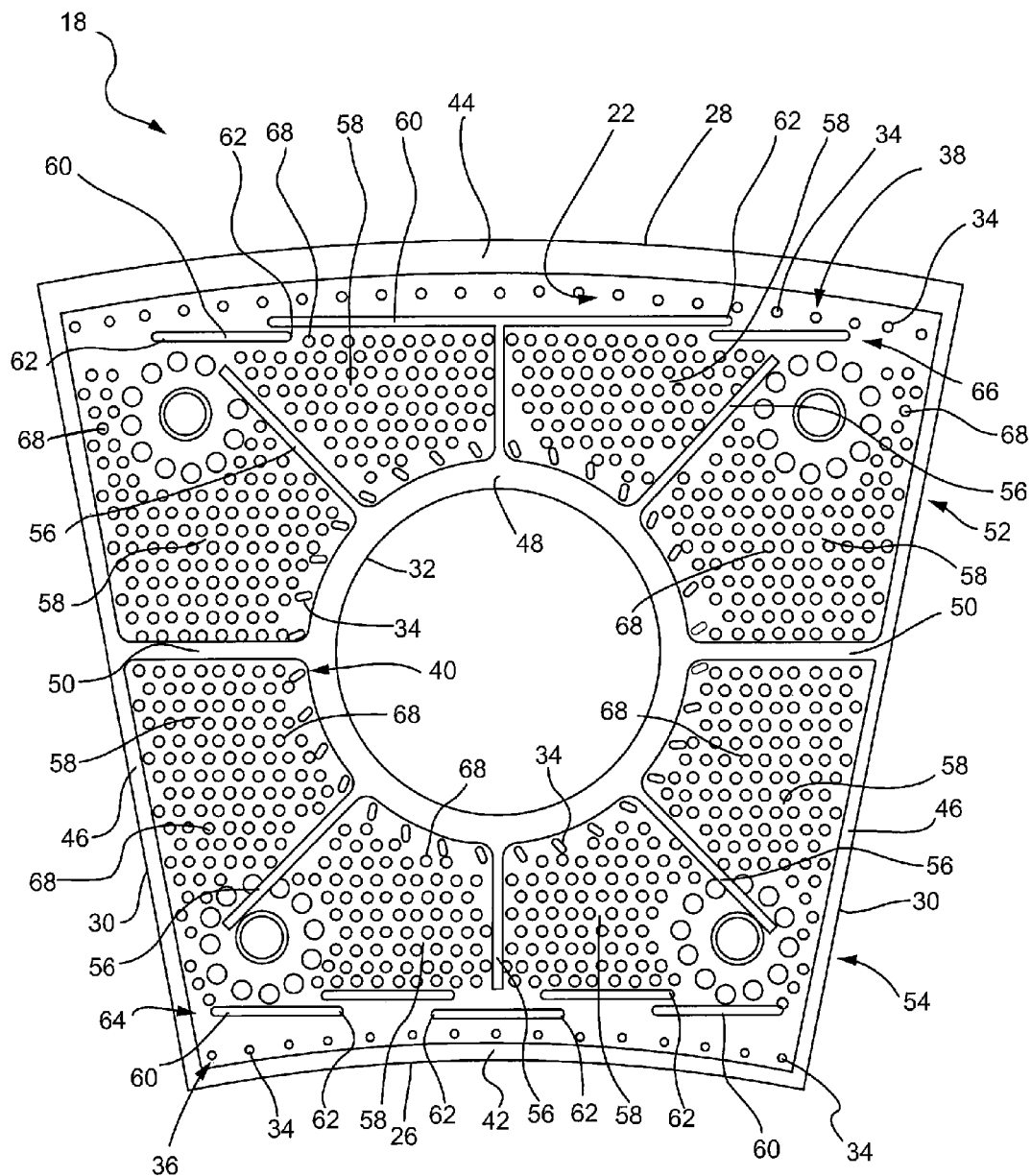
FIG. 6 is a front view of the back surface of the panel of FIG. 5.

Turning now to FIG. 6, each panel 18 may further comprise an inner rail 42 on or near the radially inner edge 26, an outer rail 44 on or near the radially outer edge 28, and two side rails 46 on or near the two lateral edges 30. A circular rail 48 may concentrically align with or surround the fuel nozzle opening 32. Extending laterally from opposite sides of the circular rail 48 (or fuel nozzle opening 32) to the two side rails 46 (or lateral edges 30) may be a mid-rail 50, which divides the panel 18 into a radially outward half 52 and a radially inward half 54 with respect to the combustor centerline. To direct the impingement flow on the back surface 22 of the panel 18, a plurality of radial rails 56 may extend radially outward from the circular rail 48 (or fuel nozzle opening 32), dividing each of the radially outward half 52 and radially inward half 54 into a plurality of compartments 58. Due to the mid-rail 50, radial rails 56 and formation of compartments 58, the impingement flow may be preferentially oriented toward the effusion holes 34. More specifically, the radial rails 56 may be placed circumferentially to enclose the flow within each compartment 58 and accelerate the flow toward the effusion holes 34 within a converging passage. Although shown as having six radial rails 56 and eight compartments 58 in FIG. 6, it will be understood that the number of rails 56 and compartments 58 on the panel 18 are for exemplary purposes only, and that any number of rails 56 and compartments 58 may be employed on the panel 18 without departing from the scope of this disclosure.

The mid-rails 50, like the radial rails 56 generally extend in a radial direction and may project from or attach to the circular rail 48. Both the mid-rails 50 and the radial rails 56, together may define at least some of the compartments 58. Unlike the radial rails 56 which terminate at a distal end, the mid-rails 50 terminate radially outward at the respective side rails 46 and thus attach to the side rails 46.

In addition, each panel 18 may have a plurality of oblong-shaped protrusions or ribs 60 laterally oriented in a staggered arrangement. The ribs 60 may in part define the radial compartments 58. Generally extending circumferentially with respect to the combustor centerline, the ribs 60 may be located near the radially inner and outer edges 26, 28 to generally or at least partially separate the inner and outer edges 26, 28 from the rest of the panel 18 thus enhancing cooling generally at the edges 26, 28. Providing flow resistance to the radially inner and outer edges 26, 28, the staggered arrangement of the ribs 60 may also allow partial flow around opposite ends 62 of each rib 60. Although shown and described as laterally oriented in a staggered arrangement, it will be understood that other orientations and arrangements of the ribs 60 may be used without departing from the scope of the invention. For example, in another embodiment, the ribs 60 may be oriented in a zig-zag formation (not shown), while still segregating the inner and outer edges 26, 28 from the rest of the panel 18.

Furthermore, the first set 36 of effusion holes 34 may be distributed between the inner rail 42 and a plurality of radial inner ribs 64, and the second set 38 of effusion holes 34 may be distributed between the outer rail 44 and a plurality of radial outer ribs 66. This results in the radial inner ribs 64 and the inner rail 42 directing flow toward the first set 36 of effusion holes 34; and the radial outer ribs 66 and the outer rail 44 directing flow toward the second set 38 of effusion holes 34. At the same time, the radial inner and outer ribs 64, 66 may partially block the impingement flow away from the inner and outer rails 42, 44, (or radially inner and outer edges 26, 28) respectively, thereby directing the flow within the compartments 58. As a result of a network of rails 42, 44, 46, 48, 50, 56, compartments 58, and ribs 60, the flow is directed and accelerated in a converging passage toward the third set 40 of effusion holes 34 surrounding the circular rail 48.

Figure 7:
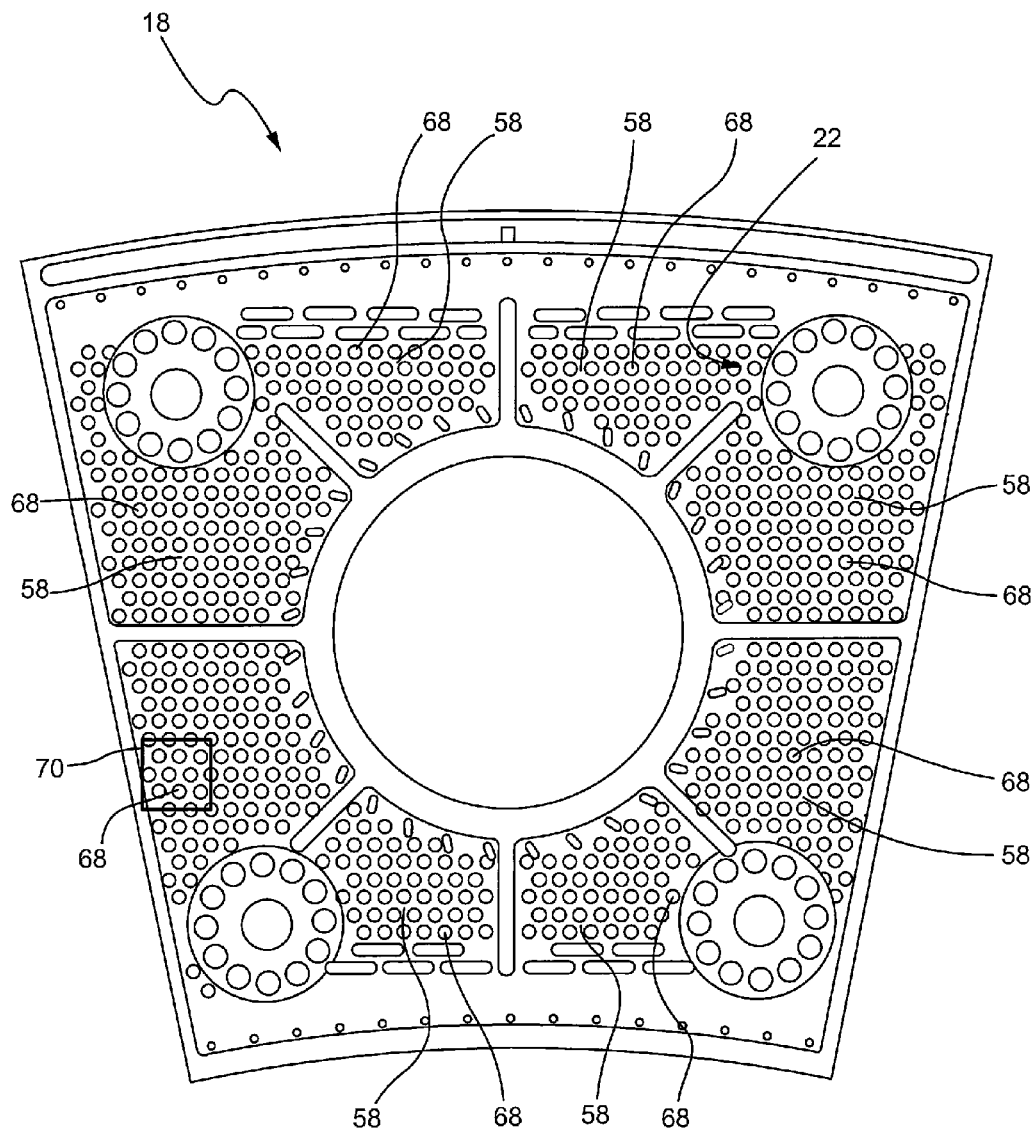
FIG. 7 is a front view of a back surface of a heat shield panel with a plurality of pins arranged in a diamond configuration according to another embodiment of the present disclosure.
Figure 8:
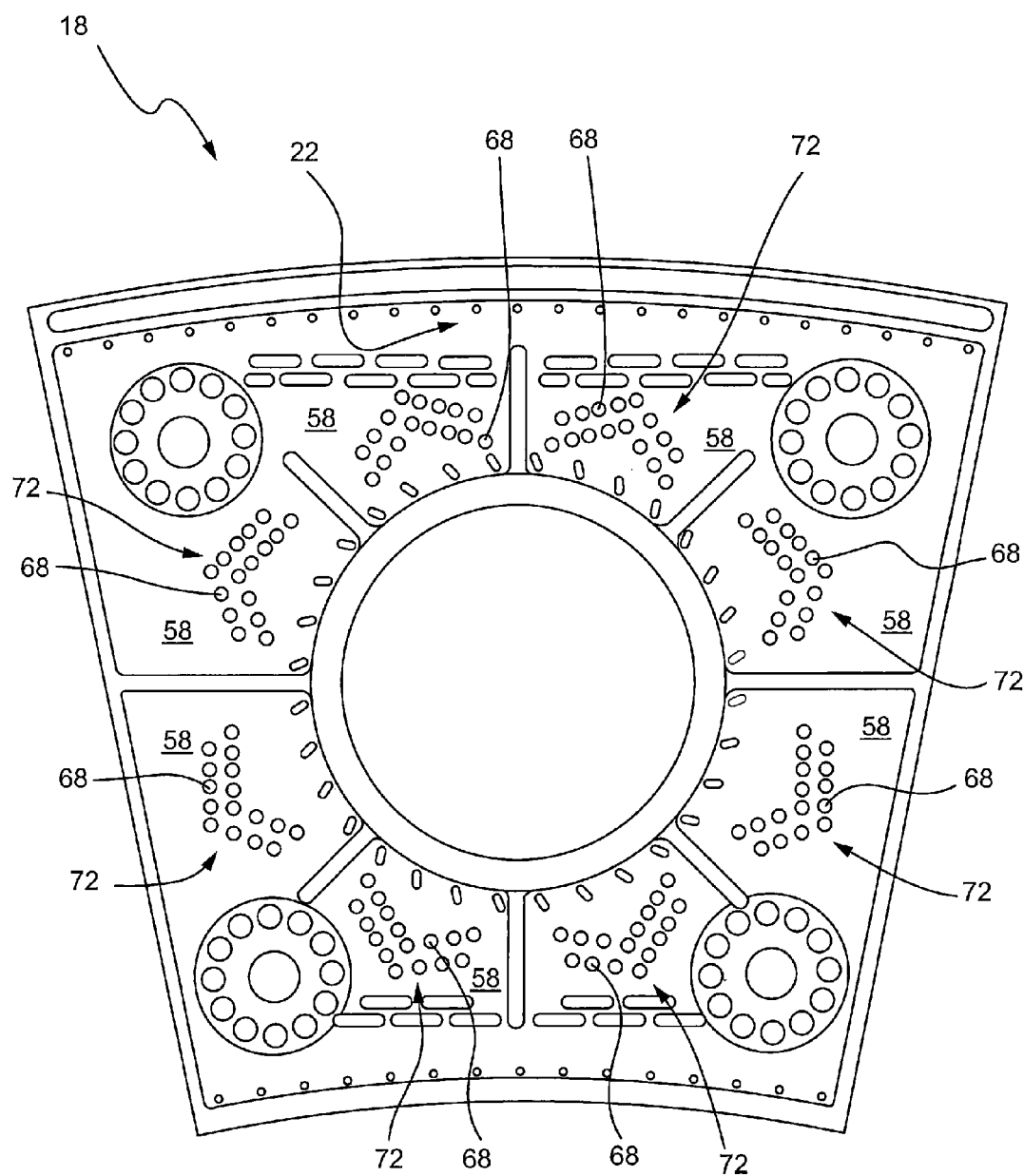
FIG. 8 is a front view of a back surface of a heat shield panel with a plurality of pins arranged in a chevron formation according to another embodiment of the present disclosure.
Figure 9:
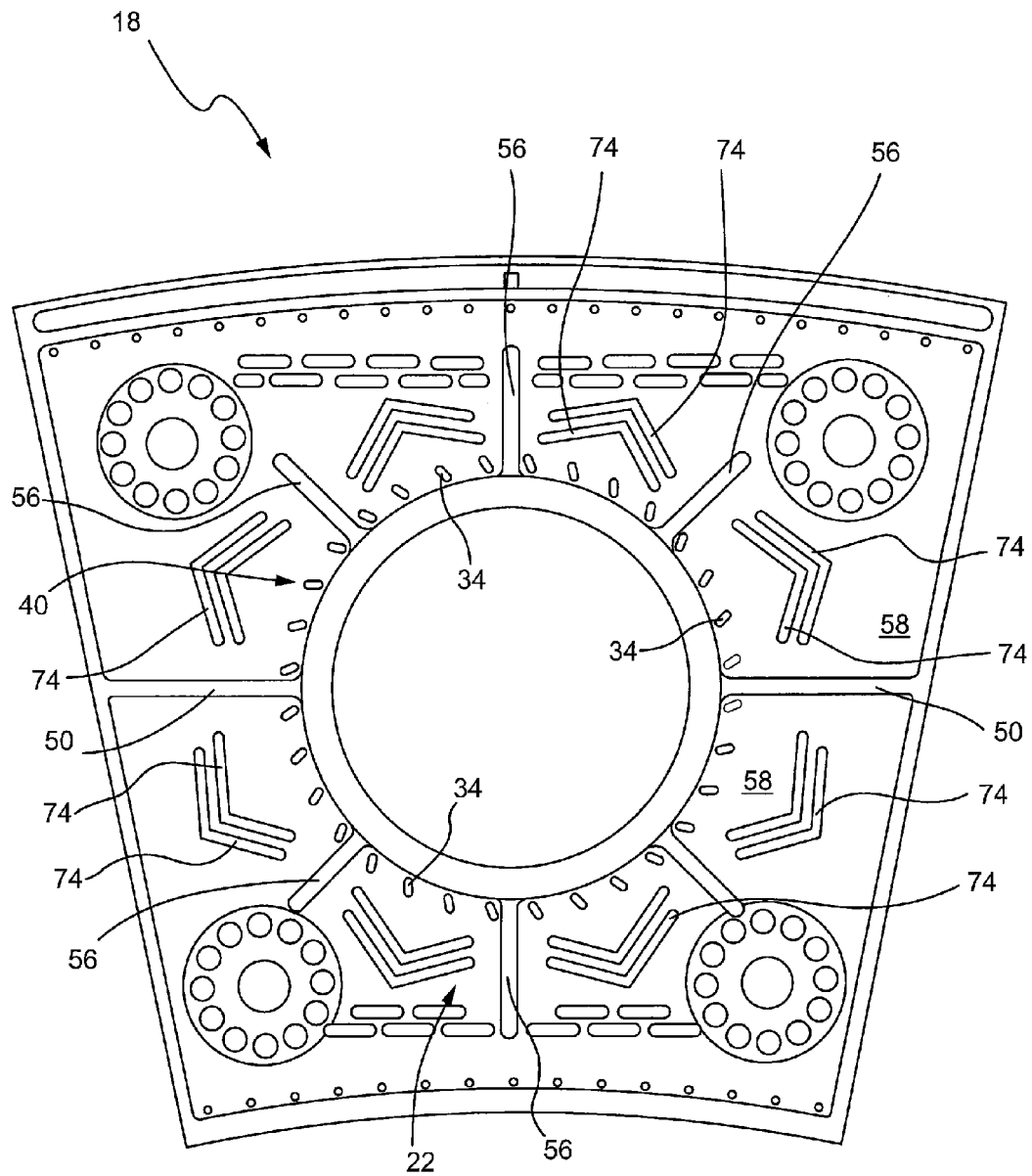
FIG. 9 is a front view of a back surface of a heat shield panel with a plurality of raised trips strips in a chevron formation according to another embodiment of the present disclosure.

Within the compartments 58, a plurality of pins 68 may extend from the back surface 22 of the panel 18 to increase a surface area of heat transfer, turbulate and direct the flow. As shown in FIG. 7, the pins 68 may be spatially arranged in a diamond configuration, such as that outlined by diamond formation 70, to enhance heat transfer and further direct the flow. As shown in FIG. 8, the pins 68 may be spatially arranged in a chevron formation 72, or two v-shaped rows of pins 68 in each compartment 58. According to another embodiment and as shown in FIG. 9, a plurality of raised trip strips 74 may extend from the back surface 22 of the panel 18 within each compartment 58. The raised trip strips 74 may be in a chevron formation, or v-shaped. The chevron formation or v-shaped configuration of pins 68 and trip strips 74 further enhance preferential orientation of the flow on the back surface 22 of the panel 18 by directing the flow to the adjacent radial rails 56 or mid-rail 50, which then guide the flow downstream toward the third set 40 of effusion holes 34 for discharge into the combustion chamber 8. Other formations and arrangements of the pins 68 and raised trip strips 74, or combinations thereof, are certainly possible.

Figure 10:
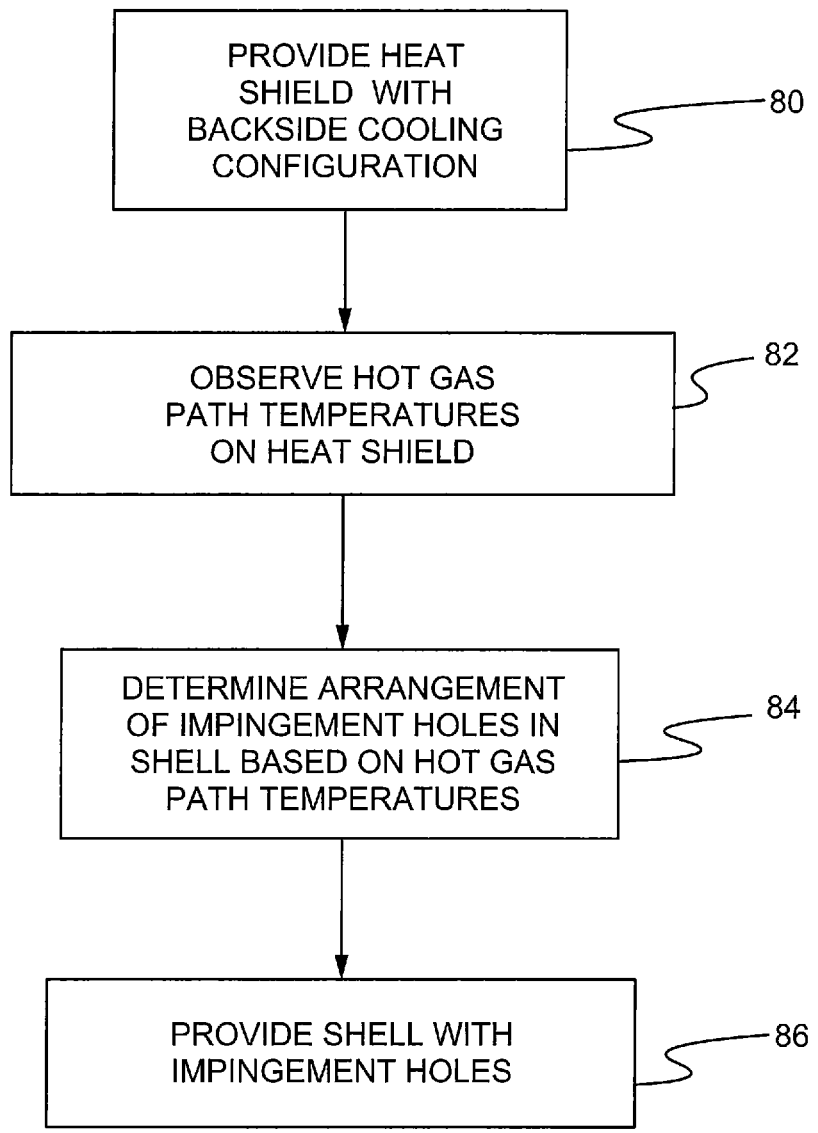
FIG. 10 is an exemplary flowchart outlining a method for designing a bulkhead assembly for a combustor of a gas turbine engine according to yet another embodiment of the present disclosure.

Turning now to FIG. 10, an exemplary flowchart outlining a method for designing a bulkhead assembly for a gas turbine engine combustor is shown, according to yet another embodiment of the present disclosure. Starting at step 80, the heat shield may be provided with a backside cooling configuration. For example, each panel of the heatshield may be provided with a body having a back surface facing the shell, an inner edge, an outer edge, a first side edge, a second side edge, and a fuel nozzle opening, an inner rail disposed about the inner edge, an outer rail disposed about the outer edge, a first side rail disposed about the first side edge, a second side rail disposed about the second side edge, a circular rail concentrically disposed about the fuel nozzle opening, and a mid-rail laterally extending from opposite sides of the circular rail to the first and second side rails, the mid-rail dividing the panel into an upper half and a lower half. Each panel may further be provided with a plurality of radial rails extending radially outward from the circular rail and dividing each of the upper and lower halves into a plurality of compartments, a plurality of pin fins provided within each of the compartments, and a plurality of effusion holes extending from the back surface of the panel to a front surface of the panel. The effusion holes may provide discharge of the flow from the back surface of the panel into a combustion chamber.

Next at step 82, hot gas path temperatures on the heat shield may be observed. At next step 84, an arrangement, number and location of the impingement holes on the shell may be determined based on the observation of hot gas path temperatures on the heat shield. The impingement hole arrangement on the shell may be designed to achieve isothermal temperatures on the panels. For example, after observing hot gas path temperatures and determining a location of hot spots on the panels, the number and location of impingement holes on the shell may be tailored to provide more cooling to the hot spots on the panels with consideration of the compartments on the back surface of the panels. At the last step 86, the shell may be provided with impingement holes at the determined locations from the previous step.

Figure 11:
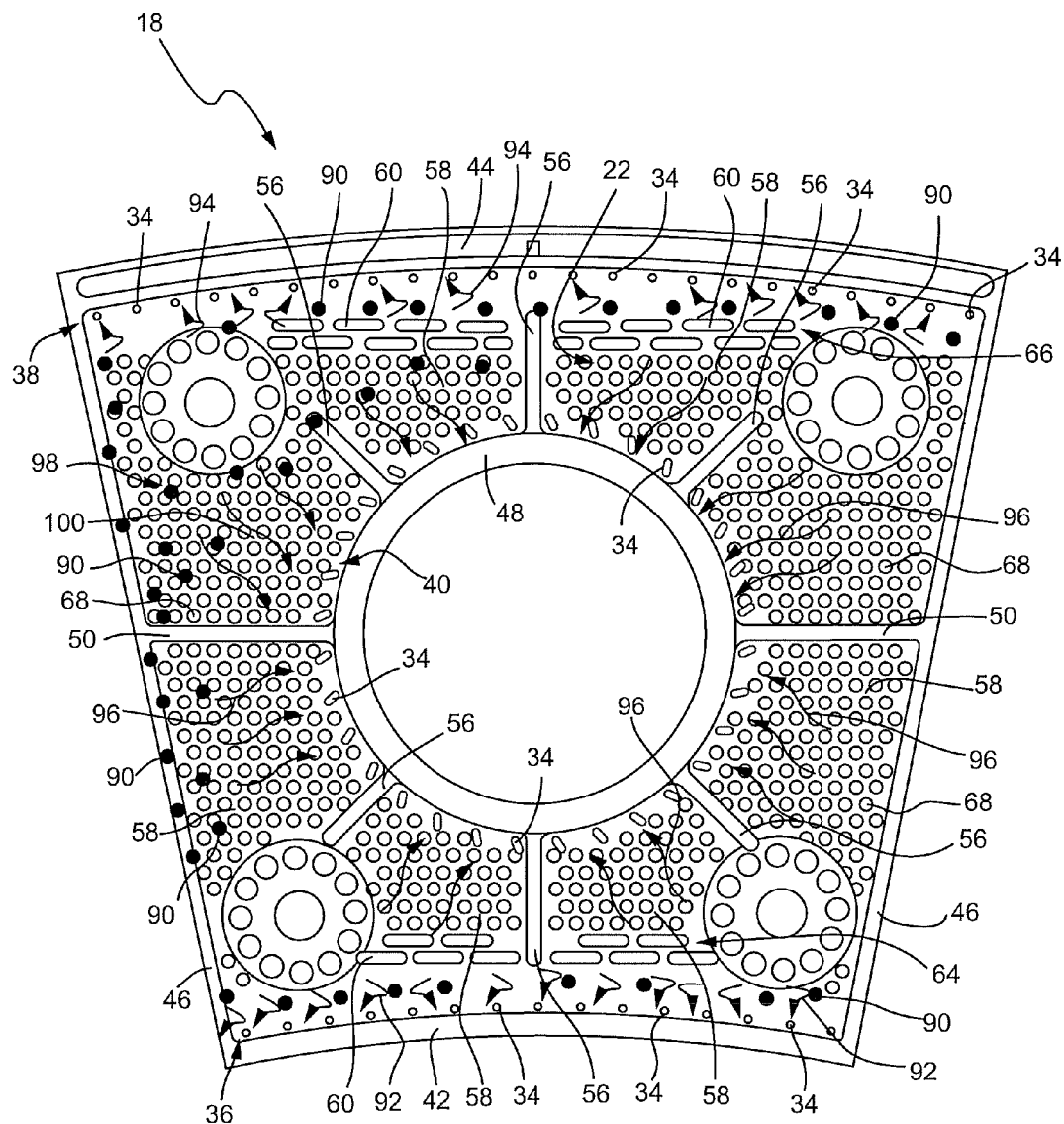
FIG. 11 is a front view of a back surface of a bulkhead heat shield panel designed using the method outlined in the flowchart of FIG. 10.

As shown in FIG. 11, a plurality of targets 90 represent the location of impingement holes and impinging air flow from the shell projected onto the back surface 22 of the panel 18. Once the flow impinges onto the back surface 22 of the panel 18, the network of rails 42, 44, 46, 48, 50, 56, compartments 58, 100, ribs 60, and pins 68 provide preferential orientation of the flow toward the effusion holes 34. Specifically, the radial inner ribs 64 and the inner rail 42 direct flow toward the first set 36 of effusion holes 34, as depicted by arrows 92. As depicted by arrows 94, the radial outer ribs 66 and the outer rail 44 direct flow toward the second set 38 of effusion holes 34. As depicted by arrows 96, the radial inner and outer ribs 64, 66, radial rails 56, inner rail 42, outer rail 44, side rails 46, circular rail 48, mid-rail 50, and pins 68 direct flow toward the third set 40 of effusion holes 34.

Furthermore, if for example, a hot spot 98 on the panel 18 is determined to be in compartment 100, increased impingement flow may be provided to compartment 100 by providing an increased number of impingement holes through the shell in the location on the shell that will project impingement flow to the targeted hot spot 98 on compartment 100 of the panel 18. Directly tailoring the number and location of impingement holes on the shell to the hot gas path temperatures and compartments on the panels of the heat shield varies the amount of cooling flow within each compartment. As a result, hot spots on the heat shield can be accounted for and isothermal temperatures or an improved temperature distribution can be achieved.

It will be understood that the arrangement, number, location, and placement of impingement hole targets 90, radial rails 56, compartments 58, 100, effusion holes 34, ribs 60, and pins 68 shown in FIG. 11 are for exemplary purposes only and that any type of variation of these components may be made without departing from the scope of this disclosure. For example, the number and placement of radial rails 56 and compartments 58, 100 may vary due to the hot gas path temperatures and location of hot spots. In addition, the number of effusion holes in the heat shield may vary with respect to the number of impingement holes in the shell (or vice versa) in order to customize the pressure drop across each of the heat shield and the shell and optimize the pressure drop across the bulkhead assembly.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The disclosure described provides an effective cooling configuration for the bulkhead assembly of a gas turbine engine combustor. By compartmentalizing the back surface of the panels, the impingement flow is provided with preferential orientation, thereby increasing the cooling effectiveness while utilizing a minimal cooling flow budget. Moreover, by tailoring the location and number of impingement holes on the shell, isothermal temperatures on the panels can be achieved. In addition, the ribs and pin arrangements disclosed herein enhance the ability to direct flow and transfer heat on the panels. As a result of the numerous cooling features disclosed herein, the durability and part life of the bulkhead assembly is improved.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. A heat shield for a combustor comprising:
   a body having first and second side edges, an inner edge, an outer edge, a back surface and a front surface opposite the back surface, wherein an opening in the body communicates through the front and back surfaces;
   a plurality of effusion holes extending from the back surface to the front surface, the plurality of effusion holes providing discharge of cooling air flow from the back surface to the front surface; and
   a plurality of rails disposed on the back surface for orienting and directing cooling air flow, the plurality of rails including
      a first side rail disposed on the first side edge,
      a second side rail disposed on the second side edge,
      a circular rail disposed about the opening,
      first and second mid-rails extending from opposite sides of the circular rail, the first mid-rail joining the circular rail and the first side rail, and the second mid-rail joining the circular rail and the second side rail,
      a radially inner rail extending along the inner edge, the radially inner rail joining the first side rail and the second side rail,
      a radially outer rail extending along the outer edge, the radially outer rail joining the first side rail and the second side rail, and
      at least one radial rail extending outwardly from the circular rail.

2. The heat shield of claim 1, wherein the plurality of effusion holes extend at an angle from the back surface to the front surface.

3. The heat shield of claim 1, further comprising at least one oblong-shaped rib disposed on the back surface.

4. The heat shield of claim 1, further comprising a plurality of radial inner ribs disposed on the back surface near the inner edge.

5. The heat shield of claim 1, further comprising a plurality of radial outer ribs disposed on the back surface near the outer edge.

6. The heat shield of claim 1, wherein the combustor has a centerline, and wherein the mid-rail divides the body into a radially outward half and a radially inward half with respect to the centerline of the combustor.

7. The heat shield of claim 6, further comprising:
   a first set of effusion holes disposed between the radially inner rail and a plurality of radial inner ribs, the radially inner rail and the plurality of radial inner ribs directing the cooling air flow to the first set of effusion holes; and
   a second set of effusion holes disposed between the radially outer rail and a plurality of radial outer ribs, the radially outer rail and the plurality of radial outer ribs directing the cooling air flow to the second set of effusion holes.

8. The heat shield of claim 7, further comprising a third set of effusion holes surrounding the circular rail, and wherein the radially inner, radially outer, first side, second side, circular, first mid-, second mid- and at least one radial rails and the plurality of radial inner ribs and the plurality of radial outer ribs direct the cooling air flow to the third set of effusion holes.

9. The heat shield of claim 8, wherein the plurality of radial inner ribs and the plurality of radial outer ribs generally extend circumferentially with respect to the centerline of the combustor and are laterally oriented in a staggered arrangement near the inner and outer edges, respectively.

10. The heat shield of claim 8, wherein a staggered arrangement of the plurality of radial inner ribs and the plurality of radial outer ribs at least partially separates the inner and outer edges from the rest of the body.

11. The heat shield of claim 1, further comprising a plurality of pins on the back surface, the plurality of pins spatially arranged in a diamond formation.

12. The heat shield of claim 1, further comprising a plurality of pins on the back surface, the plurality of pins spatially arranged in a chevron formation.

13. The heat shield of claim 1, further comprising a plurality of raised trip strips on the back surface, the plurality of raised trip strips configured to further direct cooling air flow on the back surface.

14. The heat shield of claim 13, wherein the plurality of raised trip strips are v-shaped.

15. A bulkhead assembly comprising:
   a heat shield mounted to and spaced apart from a shell, the shell having a plurality of impingement holes through which cooling air flow passes and impinges on the heat shield, the heat shield having
      a body having first and second side edges, an inner edge, an outer edge, a back surface, and a front surface opposite the back surface, wherein an opening in the body communicates through the front and back surfaces,
      a circular rail disposed about the opening,
      first and second side rails disposed on the first and second side edges,
      first and second mid-rails extending from opposite sides of the circular rail, the first mid-rail joining the circular rail and the first side rail, and the second mid-rail joining the circular rail and the second side rail, a plurality of radial rails disposed on the back surface and extending radially outward from the circular rail, the plurality of radial rails dividing the back surface of the body into a plurality of compartments for directing the cooling air flow, a radially inner rail extending along the inner edge, the radially inner rail joining the first side rail and the second side rail, a radially outer rail extending along the outer edge, the radially outer rail joining the first side rail and the second side rail, and a plurality of effusion holes in the body communicating through the front and back surfaces, the plurality of effusion holes providing discharge of the cooling air flow from the back surface to the front surface, wherein the first and second side rails, the radially inner rail, and the radially outer rail orient the cooling air flow toward the plurality of effusion holes.

16. The bulkhead assembly of claim 15, wherein each of the impingement holes through the shell is located to achieve isothermal temperatures on the heat shield.

17. The bulkhead assembly of claim 15, wherein hot gas path temperatures and the plurality of compartments on the back surface of the heat shield determine a number and location of the plurality of impingement holes on the shell.

18. A combustor for a gas turbine engine, comprising:

an inner liner and an outer liner defining a combustion chamber; and a bulkhead assembly at one end of the combustion chamber, the bulkhead assembly having a heat shield mounted to and spaced apart from a shell, the heat shield having a body having first and second side edges, an inner edge, an outer edge, a back surface, a front surface opposite the back surface, the back surface facing the shell, and an opening in the body communicating through the front and back surfaces, and a plurality of rails disposed on the back surface, the plurality of rails dividing the back surface of the body into a plurality of compartments for directing cooling air flow, the plurality of rails including a first side rail disposed on the first side edge, a second side rail disposed on the second side edge, a radially inner rail extending along the inner edge, the radially inner rail joining the first side rail and the second side rail, a radially outer rail extending along the outer edge, the radially outer rail joining the first side rail and the second side rail, a circular rail concentrically disposed about the opening, first and second mid-rails extending from opposite sides of the circular rail, the first mid-rail joining the circular rail and the first side rail, and the second mid-rail joining the circular rail and the second side rail, and at least one radial rail extending outwardly from the circular rail, the shell having a plurality of impingement holes through which cooling air flow passes and impinges on the back surface of the body of the heat shield, each of the impingement holes located to achieve isothermal temperatures on the heat shield, wherein the plurality of rails and the plurality of compartments provide orientation of the cooling air flow toward a plurality of effusion holes through the body of the heat shield.

* * * * *